United States Patent
Cogswell et al.

(10) Patent No.: US 7,290,393 B2
(45) Date of Patent: Nov. 6, 2007

(54) METHOD FOR SYNCHRONIZING AN INDUCTION GENERATOR OF AN ORC PLANT TO A GRID

(75) Inventors: Frederick James Cogswell, Glastonbury, CT (US); Pengju Kang, Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 733 days.

(21) Appl. No.: 10/839,914

(22) Filed: May 6, 2004

(65) Prior Publication Data

US 2005/0247059 A1  Nov. 10, 2005

(51) Int. Cl.
*F01K 25/08* (2006.01)
(52) U.S. Cl. .............................. 60/651; 60/660; 60/671
(58) Field of Classification Search ................. 60/651, 60/660, 671
See application file for complete search history.

(56) References Cited

U.S. PATENT DOCUMENTS

| | | | |
|---|---|---|---|
| 5,186,013 A | * | 2/1993 | Durso ......................... 62/115 |
| 5,448,889 A | * | 9/1995 | Bronicki ................... 60/641.14 |
| 5,714,862 A | | 2/1998 | Mikesell et al. |
| 6,450,283 B1 | * | 9/2002 | Taggett ........................ 180/304 |
| 7,200,996 B2 | * | 4/2007 | Cogswell et al. ............. 60/651 |
| 2002/0108372 A1 | | 8/2002 | Bronicki |
| 2003/0213246 A1 | | 11/2003 | Coll et al. |
| 2004/0128999 A1 | | 7/2004 | Bronicki |
| 2005/0006957 A1 | | 1/2005 | Bronicki |

OTHER PUBLICATIONS

I'm Longing for Something New. 2 pgs., www.isme.or.ip/led/NewsLetter41/41J5.htm, Apr. 20, 2004.

* cited by examiner

*Primary Examiner*—Hoang Nguyen
(74) *Attorney, Agent, or Firm*—Marjama Muldoon Blasiak & Sullivan LLP

(57) ABSTRACT

The invention is a system and method for synchronizing an induction machine to an electrical grid. The embodiment described is an ORC power plant having a motor-generator in mechanical communication with a turbine. The motor-generator is operated with open windings (e.g., freewheeling) by driving the turbine with a variable speed pump. The rotational speed of the motor-generator is sensed. When the motor-generator is operating at a rotational speed near the steady state rotational speed that corresponds to operation of the ORC power plant, the contacts between the motor-generator windings and the grid are closed, and the motor is synchronized with the grid.

11 Claims, 4 Drawing Sheets

METHOD FOR SYNCHRONIZING AN INDUCTION GENERATOR OF AN ORC PLANT TO A GRID

CROSS-REFERENCE TO RELATED APPLICATIONS

This application is related to co-pending U.S. patent application Ser. No. 10/840,775, filed on even date herewith, entitled "Startup and Control Methods for an ORC Bottoming Plant," which application is incorporated herein by reference in its entirety, and which application is subject to assignment to the same assignee as the present application.

FIELD OF THE INVENTION

The invention relates to startup procedures for induction generators. More particularly, it relates to a synchronization procedure for an ORC motor-generator connected to a turbine.

BACKGROUND OF THE INVENTION

Traditionally, an induction generator can be started up as a motor using grid power to establish an excitation. With this method, the machine starts as a motor (i.e., consuming power), and it runs at slightly less than the grid synchronous speed. In an ORC machine, refrigerant vapor is subsequently directed to the turbine inlet, and is expanded by the turbine. As the flow of refrigerant increases, the induction machine changes its operating mode from a motor to a generator. As a generator, it runs at a speed slightly higher than the synchronous speed.

For large induction machines, starting as a motor requires the use of additional protection measures to avoid high inrush current. Low-voltage starters such as an autotransformer or a Wye-Delta starter are commonly used.

U.S. Pat. No. 5,714,862, issued to Mikesell et al. on Feb. 3, 1998, discloses a rotational speed measurement technique for a coasting induction motor. The speed is measured by sensing the residual electrical voltages at the power terminals of the motor, thus eliminating the need for conventional tachometer equipment, additional mechanical components, or modifications to the induction motor itself.

SUMMARY OF THE INVENTION

In one aspect, the invention relates to an ORC power generation plant. The ORC power generation plant comprises a motor-generator configured to be switchably connected directly to, and to be disconnected from, a power grid; a circulation path for a working fluid, comprising a turbine in mechanical communication with the motor-generator and having a fluid inlet and outlet; an evaporator having a thermal input for receiving thermal energy, an input for receiving the working fluid in liquid form, and an output in fluid communication with the fluid inlet of the turbine for providing the working fluid in vapor form to the fluid inlet of the turbine; a condenser having an input in communication with the outlet of the turbine for receiving the vapor from the fluid outlet, the condenser adapted to condense the vapor to the liquid and to deliver the liquid at a condenser outlet; and a variable speed pump for pumping the liquid, the variable speed pump having an input for receiving the liquid from the outlet of the condenser and an outlet for conveying the liquid to the input of the evaporator, the variable speed pump having a control signal input terminal. The ORC power generation plant additional includes a rotation speed sensor for measuring a rotation speed of the motor-generator, the rotation speed sensor providing an output signal; and a pump speed controller for controlling a speed of the pump, the pump speed controller receiving a signal based at least in part on the output signal of the rotation speed sensor and providing a control signal to the control signal input terminal of the variable speed pump. The ORC power plant is configured to start with the motor-generator configured as a generator and disconnected from the power grid as a generator.

In one embodiment, the rotation speed sensor is a selected one of a magnetic pick-up and a tachometer. In one embodiment, the rotation speed sensor is an analytic sensor configured to estimate the rotation speed. In one embodiment, the analytic sensor is a sensor configured to measure a residual magnetic field in a winding. In one embodiment, the analytic sensor is a sensor configured to measure a vibration spectrum.

In another aspect, the invention features a method of controllably starting an ORC power generation plant. The method comprises the steps of starting the ORC power generation plant during a time when a motor-generator of the ORC power generation plant is disconnected from a power grid, the ORC power generation plant comprising a circulation path for a working fluid, the circulation path comprising a variable speed pump and a turbine in mechanical communication with the motor-generator; controlling an operation of the variable speed pump to drive the turbine, and thereby, the motor-generator; measuring a rotational speed of the motor-generator; and upon attaining a rotational speed of the motor-generator approximately equal to a steady state speed of the motor-generator when powered by the power grid directly, switchably connecting the motor-generator to the power grid directly, thereby attaining steady state operation of the ORC power generation plant.

In one embodiment, the step of measuring a rotational speed of the motor-generator comprises searching for a peak of a vibration spectrum from which a rotational speed is extracted. In one embodiment, the step of measuring a rotational speed of the motor-generator comprises measuring residual magnetism in a rotor winding of the motor-generator. In one embodiment, before the ORC generator is connected to the grid, the rotational speed is controlled using the variable speed pump. In one embodiment, an increase in the pump speed increases the rotational speed. In one embodiment, a decrease in the pump speed decreases the rotational speed.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
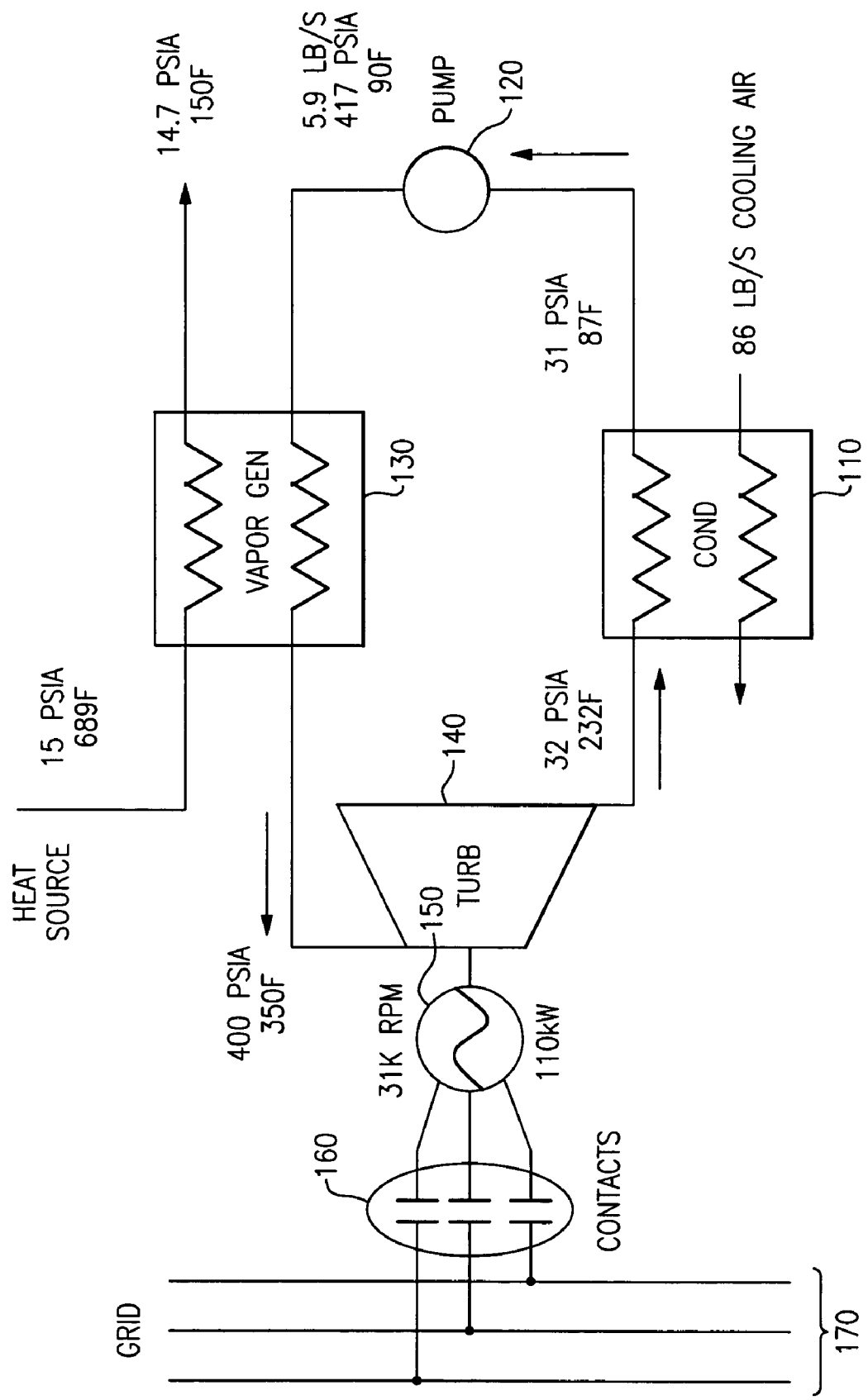
FIG. 1 is a diagram illustrating an embodiment of the ORC power plant, according to the invention.

The Organic Rankine Bottoming Cycle (ORC) may be added to a distributed generation system to increase its overall efficiency. The ORC does not consume fuel directly, but uses the waste of the "prime-mover," which may be a micro-turbine or reciprocating device or other heat source. FIG. 1 shows a schematic of an illustrative ORC power plant embodying principles of the invention. The primary components are the condenser 110, a working fluid or refrigerant pump 120, an evaporator 130, an optional recuperator (not shown in FIG. 1) and a turbine 140 connected to a motor-generator 150. The motor-generator 150 has contacts 160 which are used to connect the various motor-generator windings to a grid 170. In the embodiment shown in FIG. 1, the grid 170 and the motor-generator 150 are indicated as being three-phase electrical systems. In the embodiment discussed herein, the working fluid is 1,1,1,3,3-pentafluoropropane (known as R245fa), which is available from the Honeywell Corporation or E. I. DuPont DeNemours and Company.

The above-identified copending U.S. patent application discusses various control methods for achieving the above goals during "steady state" operation. A separate control procedure for start up of the thermal dynamic cycle has been disclosed in the above-identified copending U.S. patent application. The present disclosure discusses a startup procedure for the turbine generator unit of an ORC plant.

A startup method has been devised that allows the smooth connection of an induction generator to a grid without using additional equipment such as an autotransformer or a Wye-Delta starter. Thus a turbine/generator may be started with a simple inexpensive across-the-line contact starter. To accomplish this, the ORC plant is started with the contacts between the grid and generator open. The thermodynamic cycle is then activated by applying heat to the evaporator and controlling the liquid refrigerant pump. The pressure ratio, the turbine exit pressure divided by the inlet pressure, across the turbine begins at zero, but then increases. The pressure is controlled so that in this "freewheeling" state, the turbine 140, and with it the driven motor-generator 150, slowly increases toward synchronous speed. When the speed is near to the synchronous speed for the motor-generator, the across-the-line contactor 160 is closed.

There are two important new elements to accomplishing this startup method:
1. A method by which the freewheeling speed of the turbine and motor-generator may be controlled as described hereinafter; and
2. An accurate (~1%) measurement of the rotational speed of at least one of the motor-generator and the turbine when the motor-generator is near synchronous speed, as described hereinbelow.

In the disclosure of the above-identified co-pending application, a smooth startup procedure for the thermal cycle of the ORC plant is described. During this startup period, the pressure upper limit of the superheat control system is varied dynamically to move the system operation from one region to another. The startup method transitions from open loop to closed loop, and then varies the pressure limits to slowly increase the operation pressure according to the following procedure:

The method includes the steps of:
- applying hot air to the evaporator, for example at approximately half the design enthalpy flux;
- turning on the pump at a reduced or minimum speed, for example 15 Hz;
- setting a high pressure limit to a value of pressure that can be achieved at steady-state at the initial low pump speed, for example 70 psia;
- waiting until the operating conditions come to the pressure plateau of the pump curve; ramping up the pressure limit to its normal value, such as 280 psia;
- permitting the mode to switch from pressure control to superheat control at a pressure at or below the desired pressure limit, such as 280 psia; and
- increasing and controlling the hot air enthalpy flux to bring the system to full load, defined as maximum pressure and temperature at the evaporator exit.

Figure 2:
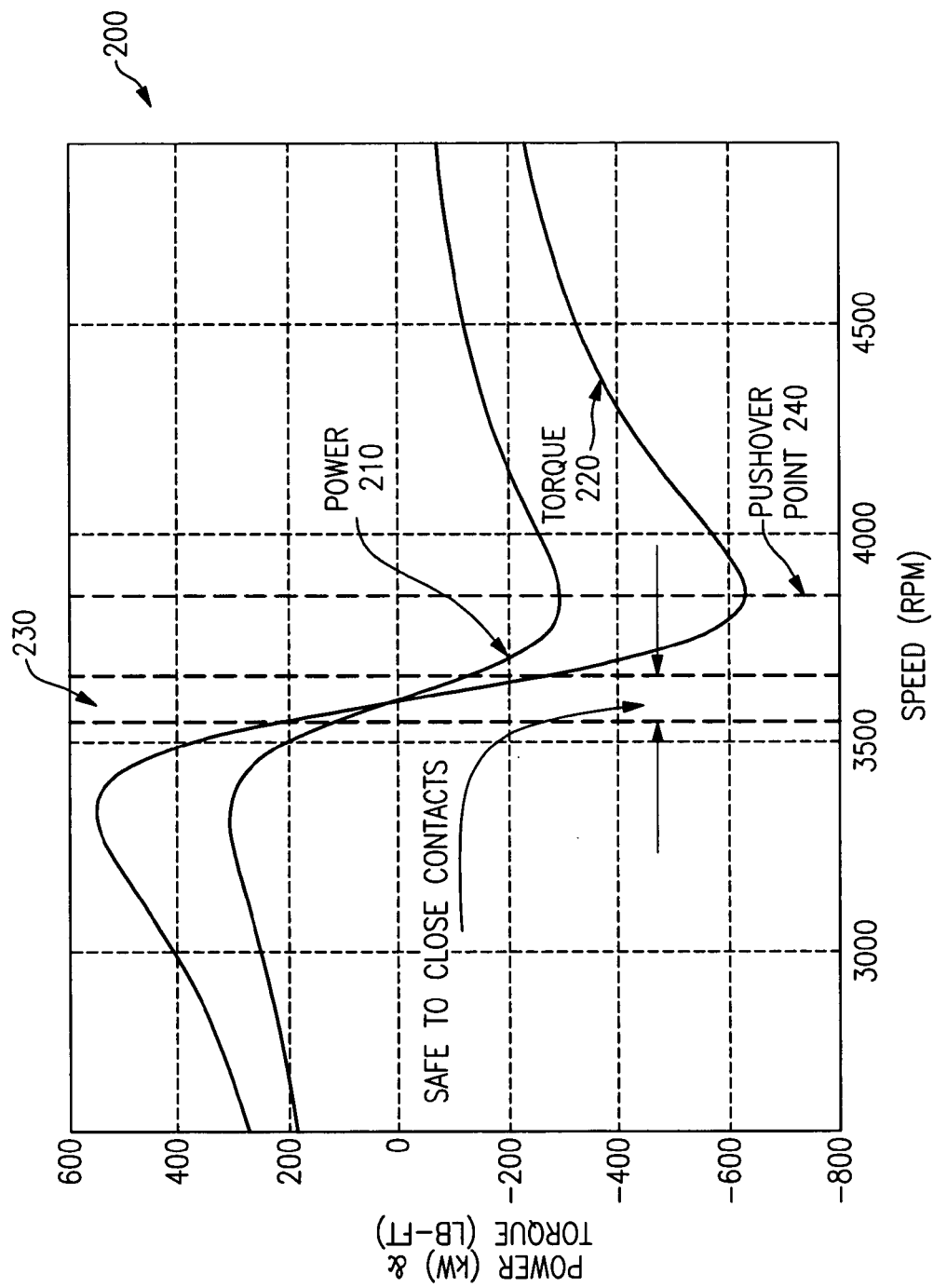
FIG. 2 is a diagram that illustrates the relations between power and torque as a function of rotational speed for a motor useful in performing the methods of the invention.

Once the startup process enters the ramping up step, the speed of the turbine generator unit is continuously being monitored. As soon as the speed reaches a value near the synchronous speed (for example, within 5% of the synchronous speed), the contacts are closed, completing the synchronizing process of the generator. To utilize an induction machine as a generator, it is helpful to ensure that when the machine is connected to the grid, the speed of the rotor should be below the speed corresponding to the pushover point of the torque-speed characteristics as shown in FIG. 2. Once the system passes over the pushover point, the rotor speed will be out of control, endangering the integrity of the generator. If such an event occurs, the entire ORC system has to be immediately shut down.

FIG. 2 is a diagram 200 that illustrates the relations between power 210 and torque 220 as a function of rotational speed for a motor useful in performing the methods of the invention. As is seen, a range of rotational speed 230 is indicated, wherein it is safe to connect the motor to the grid by closing the electrical contacts to the motor. The pushover point 240 is indicated by a vertical line, which in the embodiment shown corresponds to a rotational speed of approximately 3840 RPM. The pushover point is defined as the rotational speed beyond which the generating torque decreases with increasing speed, which would lead to a runaway condition if unchecked.

Speed Sensors

One way to measure the speed of the turbine is to use any commercially available rotation speed sensor, such as a tachometer or a magnetic pick-up sensor. A magnetic pick-up sensor is essentially a coil wound around a permanently magnetized probe. When discrete ferromagnetic objects such as gear teeth, turbine impeller blades, slotted discs, or shafts with keyways are passed through the probe's magnetic field, the flux density is modulated. This induces AC voltages in the coil. One complete cycle of voltage is generated for each object (or slot) that passes by the coil. If the objects (or slots) are evenly spaced on a rotating shaft, the total number of cycles will be a measure of the total rotation, and the frequency of the AC voltage will be directly proportional to the rotational speed of the shaft. It is well known to measure AC frequency, for example with a counter.

Analytical Sensors

Speed measurement using physical sensors requires the installation of the sensors onto the shaft of the generator. Analytical sensors have the advantage of avoiding any physical contact with the generator, and can be implemented using relatively inexpensive circuitry and, as needed, electromechanical components. Analytical sensors are therefore generally less expensive options than convention sensors such as tachometers. The rotational speed of the rotor can be estimated analytically in two ways. The first way is to use the residual magnetism in the rotor winding to sense the speed of the rotor. In the freewheeling state, the stator winding circuit is open. Due to the residual magnetism in the rotor winding, a small AC voltage will be induced in the stator winding. This open circuit voltage across the stator winding terminals can be used to estimate the speed of the rotor. A frequency counter can be used to count the zero crossing points of the measured voltage waveform, thus giving the estimation of the rotor speed.

Figure 3:
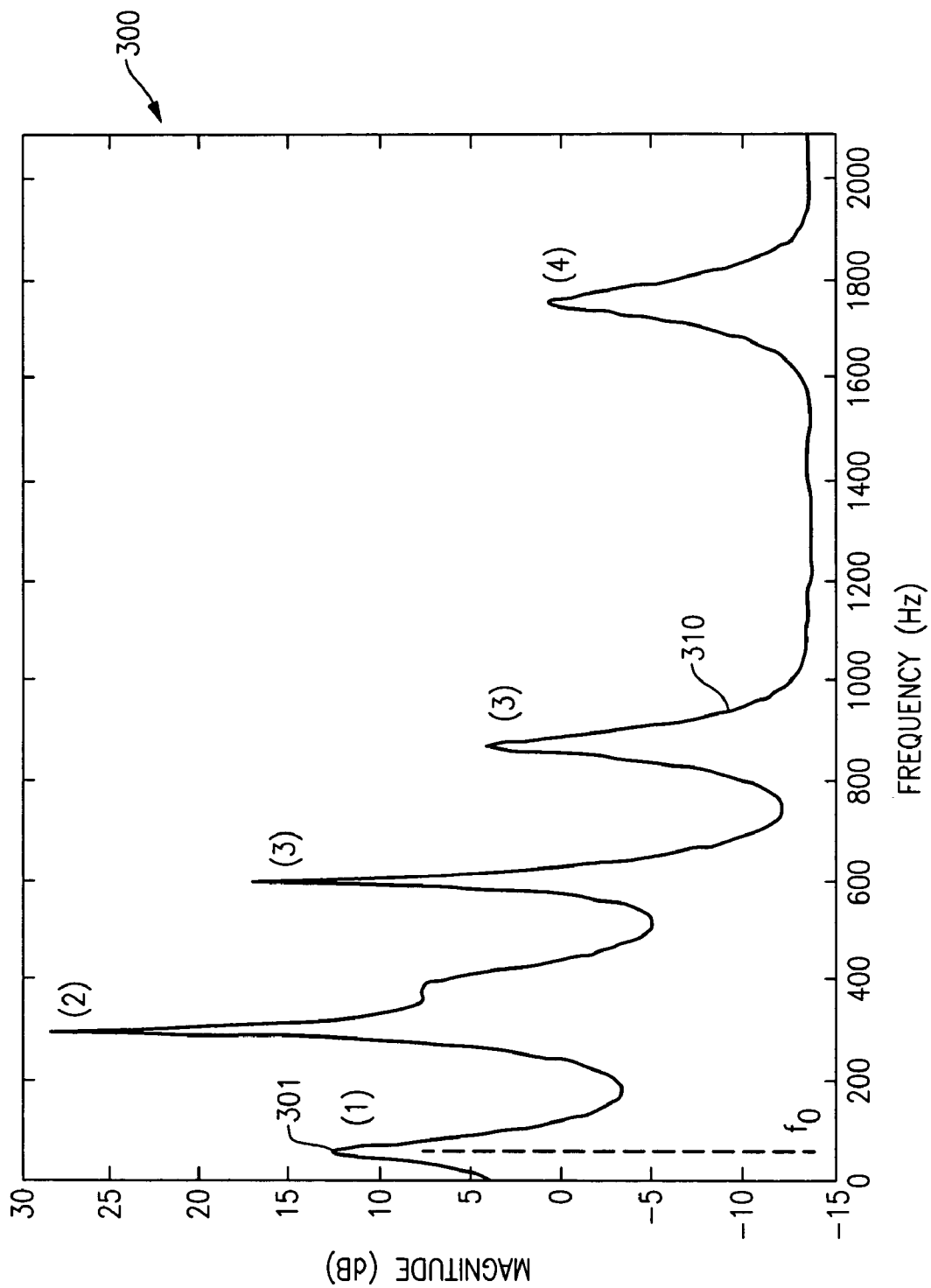
FIG. 3 is a diagram showing a spectrum of the vibration data measured on the casing of an ORC turbine-generator, according to principles of the invention.

The second analytical technique is to use an accelerometer to measure the vibration of the turbine. The vibration sensor can be installed on the casing of the turbine. The vibration data are continuously captured and the spectrum of the vibration is calculated using the fast Fourier Transform, in a computational device that can be any of a programmed general purpose computer or general purpose microprocessor that uses a program comprising one or more instructions recorded on a machine-readable medium, or other devices that can perform computations, such as a programmed gate array such as a FPGA, or a DSP. From the spectrum, the rotation speed of the rotor can be estimated. FIG. 3 is a diagram 300 that shows a spectrum 310 of the vibration data measured on the casing of an ORC turbine-generator. There are a number of peaks in the spectrum, which corresponds to mainly the rotor rotational frequency and its harmonics. The first peak 301 in FIG. 3 corresponds to the rotor rotational frequency ($f_0$), from which the rotational speed is calculated according to:

$$n = \frac{120 f_0}{P}$$

where n is the rotational speed of the generator, and $f_0$ is the rotor rotational frequency extracted from the spectrum, and P is the number poles of the rotor.

The ORC controller, implemented with a peak-searching algorithm, automatically extracts the first peak from the spectrum and uses it for the speed calculation. The commonly used peak searching algorithms known in the art can be used for rotor rotational speed extraction from the spectrum.

Figure 4:
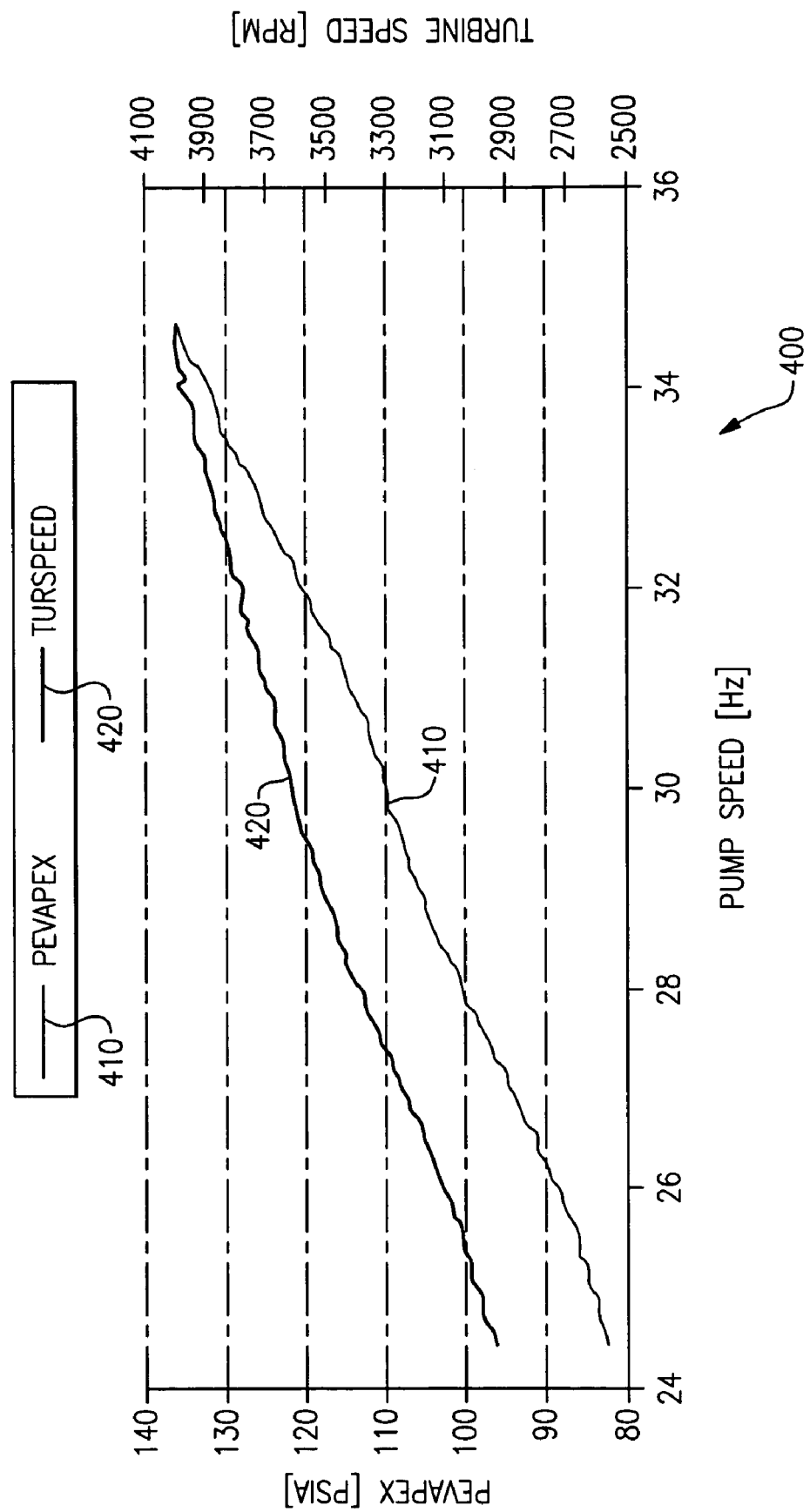
FIG. 4 is a diagram showing test data indicating the relationship between pump speed and the corresponding evaporator exit pressure and turbine speed of an embodiment of the invention.

FIG. 4 is a diagram 400 that shows test data indicating the relationship between pump speed and the corresponding evaporator exit pressure (PEVAPEX) 410 and turbine speed (TURSPEED) 420 of an embodiment of the invention in an ORC plant. The lower curve is PEVAPEX 410. In the startup process the PEVAPEX 410 is slowly ramping up through the variation in the pump speed. During this period the turbine 140 is driven by the vapor from the evaporator, and the motor-generator 150 is freewheeling. The motor-generator contacts 160 for connection to the grid are open. With the help of speed feedback, the contacts are closed when the speed of the turbine 140 and motor-generator 150 approaches the synchronous speed of the motor-generator 150, which in the present embodiment is approximately 3600 rpm. Synchronizing the generator at this speed causes minimal inrush current, thus assuring a smooth connection into the grid.

FIG. 4 also illustrates the fact that the turbine speed can be adjusted through the actuator of the superheat control loop, the variable speed pump 120. If for some reason the turbine speed is not in a range that is considered to be safe to close the contacts 160, the turbine speed can be adjusted through varying the pump speed. Variations in pump speed actually change the mass flow rate of working fluid that is entering the turbine 140, thereby changing turbine speed.

The startup procedure disclosed hereinabove is advantageous in avoiding the use of additional startup equipment, such as is used in the conventional startup procedure. The improved procedure and apparatus allows the simplification of the design of the synchronizing module of the ORC generator and reducing the costs through the avoidance of a throttle valve for turbine speed adjustment.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope of the following claims.

What is claimed is:

1. An ORC power generation plant, comprising:
  a motor-generator configured to be switchably connected directly to, and to be disconnected from, a power grid;
  a circulation path for a working fluid, comprising:
    a turbine in mechanical communication with said motor-generator and having a fluid inlet and outlet;
    an evaporator having a thermal input for receiving thermal energy, an input for receiving said working fluid in liquid form, and an output in fluid communication with said fluid inlet of said turbine for providing said working fluid in vapor form to said fluid inlet of said turbine;
    a condenser having an input in communication with said outlet of said turbine for receiving said vapor from said fluid outlet, said condenser adapted to condense said vapor to said liquid and to deliver said liquid at a condenser outlet; and
    a variable speed pump for pumping said liquid, said variable speed pump having an input for receiving said liquid from said outlet of said condenser and an outlet for conveying said liquid to said input of said evaporator, said variable speed pump having a control signal input terminal; and a rotation speed sensor for measuring a rotation speed of said motor-generator, said rotation speed sensor providing an output signal; and a pump speed controller for controlling a speed of said pump, said pump speed controller receiving a signal based at least in part on said output signal of said rotation speed sensor and providing a control signal to said control signal input terminal of said variable speed pump;

whereby said ORC power plant is configured to start with said motor-generator configured as a generator and disconnected from said power grid.

2. The ORC power generation plant of claim 1, wherein said rotation speed sensor is a selected one of a magnetic pick-up and a tachometer.

3. The ORC power generation plant of claim 1, wherein said rotation speed sensor is an analytic sensor configured to estimate said rotation speed.

4. The ORC power generation plant of claim 3, wherein said analytic sensor is a sensor configured to measure a residual magnetic field in a winding.

5. The ORC power generation plant of claim 3, wherein said analytic sensor is a sensor configured to measure a vibration spectrum.

6. A method of controllably starting an ORC power generation plant, said method comprising the steps of:

starting said ORC power generation plant during a time when a motor-generator of said ORC power generation plant is disconnected from a power grid, said ORC power generation plant comprising a circulation path for a working fluid, said circulation path comprising a variable speed pump and a turbine in mechanical communication with said motor-generator;

controlling an operation of said variable speed pump to drive said turbine, and thereby, said motor-generator;

measuring a rotational speed of said motor-generator; and upon attaining a rotational speed of said motor-generator approximately equal to a steady state speed of said motor-generator when powered by said power grid directly, switchably connecting said motor-generator to said power grid directly, thereby attaining steady state operation of said ORC power generation plant.

7. The method of controllably starting an ORC power generation plant of claim 6, wherein said step of measuring a rotational speed of said motor-generator comprises searching for a peak of a vibration spectrum from which a rotational speed is extracted.

8. The method of controllably starting an ORC power generation plant of claim 6, wherein said step of measuring a rotational speed of said motor-generator comprises measuring residual magnetism in a rotor winding of said motor-generator.

9. The method of controllably starting an ORC power generation plant of claim 6, wherein before said ORC generator is connected to the grid, said rotational speed is controlled using said variable speed pump.

10. The method of controllably starting an ORC power generation plant of claim 9, wherein an increase in said pump speed increases said rotational speed.

11. The method of controllably starting an ORC power generation plant of claim 9, wherein a decrease in said pump speed decreases said rotational speed.

* * * * *